Patented Apr. 24, 1923.

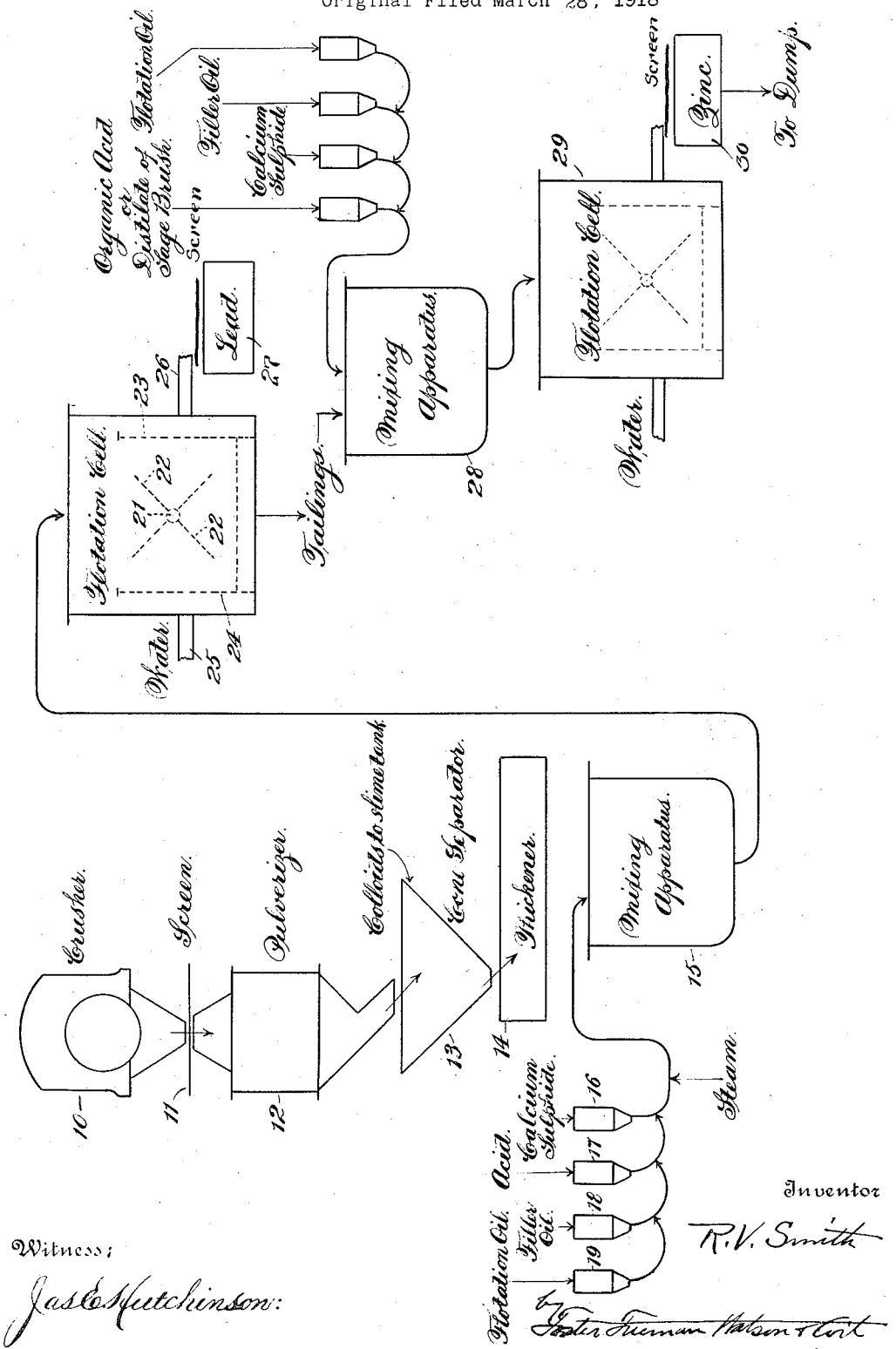

1,452,662

UNITED STATES PATENT OFFICE.

REINOLD V. SMITH, OF EUREKA, UTAH.

METHOD OF RECOVERING ZINC FROM LEAD-ZINC ORES.

Application filed March 28, 1918, Serial No. 225,294. Renewed July 22, 1922. Serial No. 576,866.

*To all whom it may concern:*

Be it known that I, REINOLD V. SMITH, a citizen of the United States, and residing at Eureka, Juab County, State of Utah, have invented certain new and useful Improvements in Methods of Recovering Zinc from Lead-Zinc Ores, of which the following is a specification.

The present invention relates to a process for the recovery of zinc from oxide ores and its separation from lead also in oxidized form. In my copending application, Serial Number 193,126, filed Sept. 25, 1917, a process has been described and claimed for recovering metals such as lead from ores by flotation. I have discovered that this method by proper modification may be employed to recover zinc from ores and to separate and recover lead and zinc from lead zinc ores. If the lead zinc ore is sulphidized in an alkaline solution the lead may be recovered by the method of my previous application, leaving the zinc in the tailings. Then if the tailings are resulphidized in a distinctly acid solution the zinc may be recovered.

The objects and features of the invention will be apparent from the description taken in connection with the drawings which diagrammatically illustrate the different steps of my process.

My method comprises the following steps:

1st. The ore is crushed preferably to substantially 30 mesh by any suitable apparatus which may comprise a crusher 10, screen 11 and pulverizer 12.

2nd. The crushed ore is separated into two portions, a granular portion as free as possible from slime or colloidal particles and the slime or colloidal portion as free as possible from granular particles. This separation may be accomplished by any suitable apparatus such as a cone separator 13.

3rd. The separated portions are sulphidized each separately and in the same manner. The treatment of the slime portion is identical with that of the sand or granular portion, except that the former requires more sulphidizer and water and less oil. Hence it will be necessary to describe the treatment of one of the portions only, say the granular. In sulphidizing this granular portion of the ore, which has been thickened by passing it through a thickener, sodium sulphide may be added. In the treatment of a certain zinc and lead ore, an oxidized zinc carbonate ore, the economical mineral of which is smithsonite or hydrozincite, for example, 15 pounds of sodium sulphide in hot solution is added to one ton hot of the granular portion of the ore. I attempt to keep the temperature above 50° C. using one-half to three-fourths of a ton of water to one ton of solids, the heat being supplied by steam. This thick pulp is then thoroughly mixed in any approved mixing apparatus 15 until the particles appear to have taken on the bluish cast of ordinary galena. The sulphidization may also be accomplished by treating the portion of the ore with hydrogen sulphide gas or nascent hydrogen sulphide developed in the pulp by very dilute acids and calcium sulphide. The nascent hydrogen sulphide has given the best results on the largest number of different ores.

A better and cheaper method consists in preparing calcium sulphide by roasting gypsum with slack coal. This can be used in a separate vessel to make hydrogen sulphide by treating with the organic acid distilled from sage brush (*Artemisia tridentata*). Again, the calcium sulphide prepared as described and the organic acid may be used in the pulp to develop nascent hydrogen sulphide, or the calcium sulphide may be added to the thick ore pulp in the mixing apparatus and very dilute sulphuric acide sprayed over the same. Hydrochloric acid is also effective. The agitation of the pulp frees the calcium sulphide particles of the adhering calcium hydroxide due to the solubility of the calcium sulphide in water sufficiently so that sulphidization may be effected with a very cheap calcium sulphide. It is to be understood that not a sufficient amount of the organic acid is added to render the pulp acid, on the contrary, it is maintained alkaline.

4th. The sulphidized pulp is now treated with a filling oil. For this purpose petroleum sludge may be used which is a waste oil obtained in refining petroleum. The object is to coat each of the concentrate particles with oil, or saturate the concentrates. I calculate the amount of filler oil from the voids in the heap of concentrates and use enough to fill about 20% of the voids, considering this about sufficient to properly saturate the concentrates, or smear the exposed mineral surfaces. This oil is added to the dampened ore in a mixing apparatus in the presence of a very small quantity of water to prevent the gangue being oiled. In the case of the ore previously mentioned, two quarts of oil per ton of solids are used. Obviously, the quantity of oil used would depend on the ore and the state to which it is crushed. The pulp with the oil added thereto is thoroughly mixed or agitated in the mixing apparatus. The same result may be accomplished in less time by adding an excess of the filler oil and pouring off the unused portion with the preliminary pulp water. This gives a satisfactorily oiling in less time and with much less mixing or agitation than when less oil is used and no decantation of the excess. Not much more oil is consumed per ton in the end, the results are obtained very quickly and the decanted preliminary pulp water with its excessive greasiness can be used over again.

5th. A flotation oil is now mixed with the pulp. After the pulp has been treated with the filler oil the flotation oil is added also in the mixing apparatus and the mixing is continued for a few minutes. The flotation oil may be crude turpentine obtained by destructive distillation of Georgia pine. About one pint per ton of solids is used. The calcium sulphide, acid, filler oil and flotation oil may be supplied to the mixing apparatus from the source of supply 16, 17, 18 and 19 respectively.

6th. The sulphidized, doubly oiled and thoroughly mixed thick pulp is now discharged from the mixing apparatus into a flotation cell 20 into about four or five times its volume of cold water as clean as possible and free from oils, slimes, and dissolved salts. The water acts best when very cold as it chills the hot pulp. However, while the change in temperature aids, it is not absolutely necessary to obtain high recoveries. Preferably the flotation cell is of the type described in my previous application. The object is to attain as nearly as possible the agitation equivalent to that given by shaking a test tube a few times. Briefly, this flotation cell comprises a box-like structure 21, which has a horizontal shaft extending longitudinally through the same carrying the paddles or arms 22. Partitions 23 and 24 are arranged adjacent the sides of the box and slightly spaced therefrom, the arrangement being such that after the operation of the paddles, water may be supplied through a pipe 25 to flow over the top of the partition 24 and float off the scum raised by the cell over the top of the partition 23 and out through the discharge 26. Preferably the paddles are given two rotations in one direction, two rotations in the oppsite, and then two rotations in the first direction. This causes a thin scum of concentrates to rise to the surface of the liquid in the cell. The water is then supplied to the cell to float off this scum. The product floated off and discharged through the outlet 26 is poured through a coarse screen into a tank 27 containing water which is at a lower elevation than the discharge 26. This pouring knocks the product down beneath the surface of the water in the tank and the product thus settled is ready for the market when shoveled out of the tank. Preferably the oiled pulp introduced into the flotation cell is given three successive agitations and discharged as outlined above. After this the bottom of the cell may be dropped and the tailings discharged and the water allowed to settle for re-use. The foregoing steps for recovering a metal from ores by flotation have been described and claimed in my prior application aforesaid.

As the ore was sulphidized in an alkaline solution the lead and not the zinc became sulphidized. Consequently, this treatment of the ore recovered only the lead leaving the zinc in the tailings. In order to recover the zinc the tailings are now carried to the mixing apparatus 28 where in the form of a thick pulp they are sulphidized in a distinctly acid solution. Formic and acetic acids, and in fact many of the acids of the fatty acids series will accomplish the result, but I have had the best results when using the liquor made by subjecting sage brush (*Artemisia tridentata*) to destructive distillation. The liquor obtained is acrid, evil smelling and contains both acids and alcohols, but the acids predominate. Except that the tailings are sulphidized in an acid instead of an alkaline solution, they are subject to exactly the same steps as already described. Thus the tailings after being sulphidized are mixed with the filler and flotation oils, are deposited in the flotation cell, and the zinc concentrates floated off from the cell 29 through a screen into a tank 30. Preferably the flotation cell is of the same type as used in the treatment of the combined ores. Too violent agitation would reduce the extraction, and the thorough but efficient mixing given by the reversing of the rotation of the paddle in the cell effects just the desired results so that recoveries far above 90% are easily obtained.

When manganese is present in the ore it sulphidizes even better than the zinc and rises in the flotation cell along with the zinc, the selective solubility of zinc and manganese minerals in dilute acids being relied upon for this purpose. It may be separated from the zinc concentrates by dissolving them apart. The process described above is applicable to ores occuring as oxides, hydrated oxides and carbonates, although it is understood that the method is not limited to these particular ores.

Having thus described the invention what is claimed as new and desired to be secured by Letters Patent is:

1. The method of separating and recovering lead and zinc from lead zinc ores consisting in sulphidizing the crushed ore in a slightly alkaline pulp, treating the same to recover the lead, resulphidizing the tailings in a pulp rendered acid by an organic acid and recovering the zinc by flotation.

2. The method of separating and recovering lead and zinc from lead zinc ores consisting in treating the ore and recovering the lead by flotation, sulphidizing the tailings in an organic acid pulp and recovering the zinc by flotation.

3. The method of separating and recovering lead and zinc from lead zinc ores consisting in treating and recovering the lead by flotation, sulphidizing the tailings in an organic acid pulp, adding the preliminary and flotation oils to the sulphidized ore in a thick pulp, depositing the oiled thick pulp in a flotation cell having substantially clean water, agitating the mixture to cause the zinc concentrates to float as a scum and collecting the scum.

4. The method of separating and recovering lead and zinc from lead zinc ores consisting in recovering the lead, sulphidizing the tailings in a weak acid pulp, adding oil and slightly agitating the oiled pulp to float the zinc concentrates.

5. The method of recovering zinc from lead zinc ores consisting in sulphidizing the crushed ore in a weak acid pulp, adding oil and recovering the zinc concentrates by flotation.

6. The method of recovering zinc from lead zinc ores consisting in sulphidizing the crushed ore in an organic acid pulp, saturating the sulphidized ore in a thick pulp with a filler oil, adding a flotation oil, dumping the doubly oiled thick pulp into several times its volume of clean water, gently agitating the mixture to cause the zinc concentrates to rise to the surface as a scum and floating off the scum.

7. The method of separating and recovering lead, zinc and manganese from ores consisting in sulphidizing the crushed ore in an alkaline pulp, treating the same to recover the lead, resulphidizing the tailings in a pulp rendered acid with an organic acid, recovering the zinc and manganese by flotation and thereafter separating the manganese and zinc.

8. The method of recovering zinc and manganese from ores consisting in sulphidizing the crushed ore in a pulp rendered distinctly acid with an organic acid, saturating the sulphidized ore as a thick pulp with a filler oil, adding a flotation oil, dumping the doubly oiled thick pulp into several times its volume of clean water, gently agitating the mixture to cause the zinc and manganese concentrates to rise to the surface as a scum, floating off the scum and treating the concentrates thus obtained to separate the zinc and manganese.

9. The method of recovering zinc and manganese from ores consisting in sulphidizing the crushed ore in a pulp rendered distinctly acid with an organic acid, treating the sulphidized pulp to recover zinc and manganese concentrates by flotation and treating the concentrates to separate the zinc and manganese.

In testimony whereof I affix my signature.

REINOLD V. SMITH.